United States Patent [19]

LaBerge et al.

[11] Patent Number: 5,142,287
[45] Date of Patent: Aug. 25, 1992

[54] TECHNIQUE FOR DEMODULATING AND DECODING MLS DPSK TRANSMISSIONS USING A DIGITAL SIGNAL PROCESSOR

[75] Inventors: Edward F. C. LaBerge, Towson; Daniel L. Vance, Edgewood, both of Md.

[73] Assignee: Allied-Signal Inc., Morris Township, Morris County, N.J.

[21] Appl. No.: 552,629

[22] Filed: Jul. 16, 1990

[51] Int. Cl.[5] .......................... G01S 7/295; G01S 7/288
[52] U.S. Cl. ........................................ 342/35; 342/195; 342/194; 342/40; 329/346
[58] Field of Search ....................... 342/35, 195, 38, 39, 342/40, 194; 329/346, 358, 360

[56] References Cited

U.S. PATENT DOCUMENTS

| | | | |
|---|---|---|---|
| 3,742,498 | 6/1973 | Dunn | 342/88 |
| 4,010,465 | 3/1977 | Dodington et al. | 342/35 |
| 4,084,137 | 4/1978 | Welti | 342/361 X |
| 4,499,586 | 2/1985 | Cafarella et al. | 375/98 |
| 4,559,538 | 12/1985 | Hetyei et al. | 342/412 |
| 4,568,942 | 2/1986 | Letocquart | 342/408 |
| 4,617,569 | 10/1986 | Letoquart | 342/412 |
| 4,623,892 | 11/1986 | Enein | 342/411 |
| 4,648,101 | 3/1987 | Hamzaoui et al. | 375/99 |
| 4,677,442 | 6/1987 | Enein | 342/410 |
| 4,757,316 | 7/1988 | Brault et al. | 342/173 |
| 4,757,320 | 7/1988 | Letoquart et al. | 342/410 |
| 4,794,543 | 12/1988 | Enein et al. | 364/486 |
| 4,823,127 | 4/1989 | Roelofs et al. | 340/947 |
| 4,890,110 | 12/1989 | Kuwahara | 342/35 |
| 5,015,962 | 5/1991 | Brault et al. | 329/346 |

OTHER PUBLICATIONS

Schwartz, M. et al, "Communication Systems and Techniques", McGraw-Hill Book Company, pp. 304–310, (1966).
"Annex 10 to the Convention on International Civil Aviation", vol. 1, Ch. 3.11, ICAO, Montreal, Oct. 1987.
"Minimum Operational Performance Standards for Microwave Landing System Airborne Receiving Equipment", DO-177, Change 2, RTCA, Wash., D.C., Sep. 1986.

Primary Examiner—John B. Sotomayor
Attorney, Agent, or Firm—Donald B. Paschburg; Howard G. Massung; Robert A. Walsh

[57] ABSTRACT

A system for demodulating and decoding differential phase shift keying (DPSK) transmissions utilizes a bandpass filter, an analog to digital converter and a digital signal processor. Removal of the effects of unknown frequency component is achieved by applying a complex phase correction/rotation factor after DPSK demodulation. The actual phase of the complex signal is never computed directly. All of the processing from Rader decomposition through carrier tracking filter is performed on the complex values and therefore requires only multiplication and addition operations which can be performed at high speed in a microcomputer or in dedicated arithmetic hardware.

10 Claims, 10 Drawing Sheets

| SEQUENCE NO. 1 | TIME (ms) | SEQUENCE NO. 2 |
|---|---|---|
| APPROACH ELEVATION | 0 | APPROACH ELEVATION |
| | | FLARE |
| | 10 | |
| APPROACH AZIMUTH | 20 | APPROACH AZIMUTH |
| | | |
| FLARE | 30 | FLARE |
| APPROACH ELEVATION | | APPROACH ELEVATION |
| | | |
| BACK AZIMUTH | 50 | GROWTH (182 ms MAX.) |
| | | |
| APPROACH ELEVATION | 60 | APPROACH ELEVATION |
| FLARE | | FLARE |
| 66.7 | | 66.8 |

FIG. 3   PRIOR ART

BPSK INFORMATION

| CARRIER ACQUISITION (UNMODULATED) | BARKER CODE | FUNCTION ID |
|---|---|---|

INFORMATION BIT NUMBER: 1 2 3 4 5 6 7 8 9 10 11 12

| | | | | | |
|---|---|---|---|---|---|
| DPSK BIT | 0 | 5 | 10 | 15 | 20 | 25 |
| TIME (μSEC) | 0 | 320 | 640 | 960 | 1280 | 1600 |

FIG. 4   PRIOR ART

8 μ sec SAMPLE NUMBER

TECHNIQUE FOR DEMODULATING AND DECODING MLS DPSK TRANSMISSIONS USING A DIGITAL SIGNAL PROCESSOR

The U.S. Government has rights in this invention pursuant to Air Force Contract No. F19628-87-C-0199

BACKGROUND OF THE INVENTION

1. Field of the Invention

The present invention relates to the Microwave Landing System. More particularly the present invention relates to detecting, demodulating and decoding the Differential Phase Shift Keying (DPSK) transmissions of function identification and data transmissions associated with the international standard Microwave Landing System (MLS).

2. Description of the Prior Art

The Microwave Landing System (MLS) is an internationally standardized means to provide precision approach and landing guidance to properly equipped user aircraft. The MLS signal format as illustrated in FIGS. 1-3 consists of a series of guidance and data functions transmitted in a time-division-multiplex (TDM) signal format on a single one of 200 channels in the microwave C-band (503-5090 Mhz). The signal format is radiated by ground stations located at the airport and received by special equipment within the user aircraft.

Each MLS function slot is identified by a unique digital code transmitted as part of the function preamble using DPSK encoding. Each digital bit is 64 usec wide, for an effective digital data rate of 15,625 bits/sec.

The function preamble for all MLS functions is divided into at least three sections, as shown in FIG. 4. The first 13 bit period (832 usec) consists of an unmodulated carrier which is equivalent to a string of binary zeros encoded into DPSK. This is followed by a five bit digital Barker Code (11101) for time synchronization. Finally, a unique seven bit function identification code, consisting of five data and two parity bits, is sent to identify the ensuing MLS function.

Many classical texts on communications theory such as *Communication Systems and Techniques*, by Schwartz, M., Bennett, W. R., and Stein, S., McGraw—Hill Book Co., New York, 1966, illustrate the simple, straightforward means of DPSK decoding shown in FIG. 5. In this approach, a delayed version of the received signal is used as the reference oscillator in a coherent detector. The coherent detector output is proportional to the phase difference between this reference and the current received signal, i.e., between the current and previous DPSK bits. The actual numerical output of the coherent detector depends on the total electrical phase of the intermediate frequency (IF) signal, $w_{if}T$, over the period, T, of a single DPSK bit, where $w_{if}$ is the angular frequency of the IF signal in radians/sec and T is measured in seconds.

As noted in *Communication Systems and Techniques* (cited above) and elsewhere, this technique is applicable only in cases where the frequency error in $w_{if}$ is small. If the frequency error, $\epsilon_{if}$, is not small, the total phase $(w_{if}+\epsilon_{if})T$ can vary significantly from the expected result. In the extremes, the output of the coherent detector in FIG. 5 could be zero (when $(w_{if}+\epsilon_{if})T=\pi/2$) or the state of the information bits could be reversed (when $(w_{if}+\epsilon_{if})T=\pi$).

In the MLS application, even a perfect receiver could experience frequency errors which exceed these limits, due to ground station frequency stability and aircraft motion doppler. This is discussed in *Annex 10 to the Convention on International Civil Aviation*, Volume 1, Chapter 3.11, ICAO, Montreal, Oct. 1987, as well as *Minimum Operational Performance Standards for Microwave Landing System Airborne Receiving Equipment*, DO-177, Change 2, RTCA, Washington, D.C., Sept. 1986. Thus, the classical approach to DPSK demodulation will not produce the desired performance under typical MLS operating conditions.

An implementation which has been successfully used in MLS receivers is shown in FIG. 6. In this approach, the input signal is used to drive a phased-locked carrier regeneration loop which provides an unmodulated local oscillator signal as a phase reference. The coherent detector output is then converted from DPSK to binary information by means of a simple digital circuit. The key feature of this previously demonstrated implementation is that the phase tracking is performed at the IF frequency, before demodulation of the DPSK information. This implementation has been very successful in MLS applications, but it requires additional hardware to implement the phase locked loop.

Previous patents in MLS signal processing such as U.S. Pat. Nos. 4,489,326 to Studenny and 4,017,862 to Wild, have centered on the decoding of the proportional angle guidance information by means of a variety of microprocessor-aided techniques. U.S. Pat. No. 4,926,186 by Kelly and La Berge and assigned to the same assignee as the present invention provides a hardware intensive computation architecture which is appropriate for applications requiring sampled data rates in excess of those easily handled in software. The present invention extends the use of a microprocessor—or digital signal processor—aiding to the phase demodulation process. Use of the described implementation allows the entire MLS decoding process to be performed within an existing microprocessor or computer, eliminating the need for relatively costly and relatively unreliable phase-locked loops for carrier regeneration. The present invention can be utilized in highly reliable MLS receiver architectures, including the Integrated Communications, Navigation, Identification (ICNI) electronics now being designed for advanced fighter aircraft and the Military Microwave Landing System Avionics Program.

SUMMARY OF THE INVENTION

The present invention detects, demodulates and decodes the Differential Phase Shift Keying (DPSK) transmissions of function identification and data transmission associated with the international standard Microwave Landing System (MLS). The design involves (1) resolution of a sampled intermediate frequency signal into a complex signal of in-phase and quadrature components by digital means, (2) coherent detection of the DPSK modulation, (3) phase tracking of the detected signal, and (4) discrimination for proper MLS signal characteristics.

In more detail the present invention provides the necessary system design parameters to allow proper decoding of MLS DPSK information. It includes application of a previously described technique which provides in-phase and quadrature outputs without additional hardware, to samples of an IF signal. This previously described technique is described in "A Simple Method for Sampling In-Phase and Quadrature Components", Rader, C. M., IEEE Transactions on Aerospace and Electronic Systems, Vol. AES-20, No. 6, November 1984. The present invention provides for a straightforward arithmetic computation to establish the average phase difference between complex samples separated by a single DPSK bit time, T, of 64 usec. It provides for tracking and removing the residual phase component wT, by using the carrier acquisition period of the MLS signal format. Finally, it provides a series of validation checks necessary to identify the demodulated signal as a valid MLS transmission.

BRIEF DESCRIPTION OF THE DRAWINGS

FIGS. 1-3 illustrate the Microwave Landing System (MLS) Signal Formats.

FIG. 4 illustrates the organization of the MLS function preamble.

DETAILED DESCRIPTION OF THE INVENTION

Figures 1, 2:
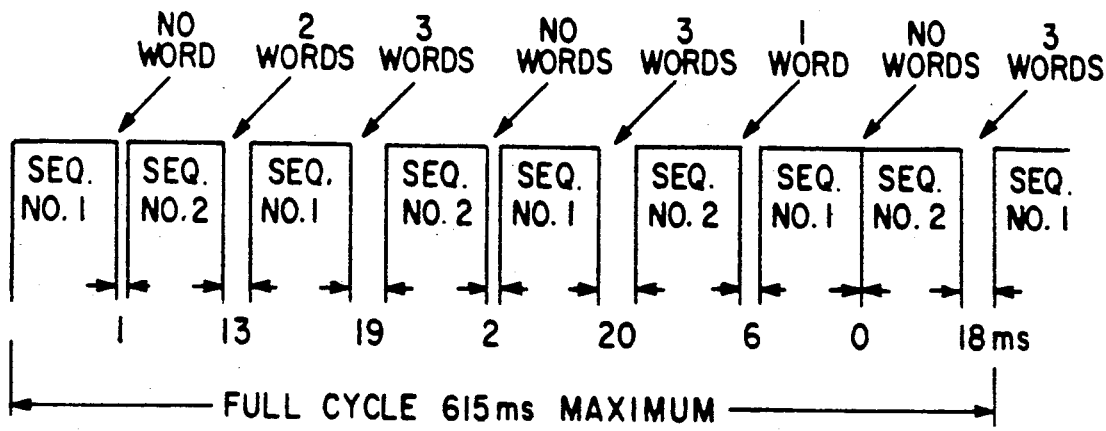
Figure 5:
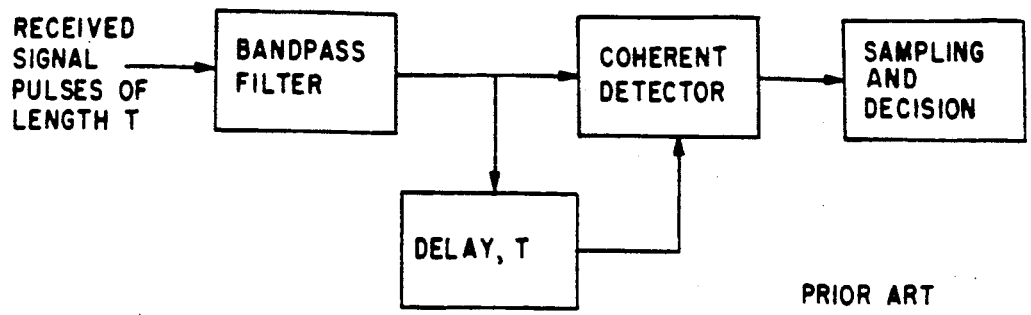
FIG. 5 illustrates the detection principle in Differential Phase Shift Keying (DPSK) decoding.
Figure 6:
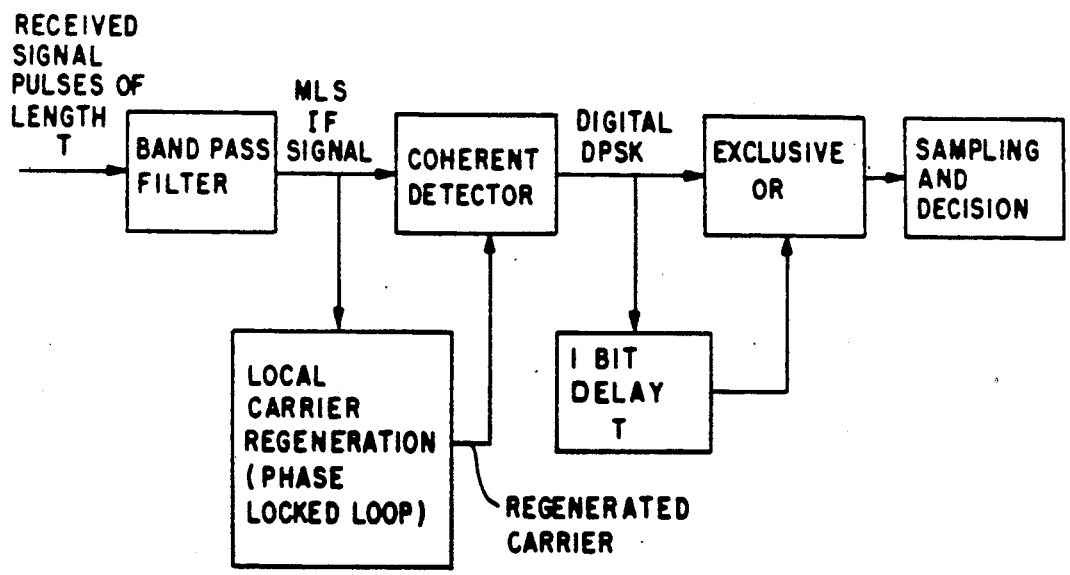
FIG. 6 illustrates one prior art technique of MLS DPSK demodulation.

The present invention performs a series of steps which allow for the accurate detection, demodulation, and decoding of DPSK-encoded digital data transmitted as part of the MLS signal format. These functions are performed within a digital signal processor, which, for the purposes of this discussion, may be considered to be a high speed microprocessor.

The theoretical basis of the present invention is based on the following quantitative signal analysis of the MLS signal. The down-converted IF signal at the input to the A/D converter illustrated in FIG. 7 may be represented by:

$$s(t) = x(t) \, \text{Real}[exp\{-j(wt + \Phi(t))\}] \tag{1}$$

where:
- x(t) is the MLS amplitude modulation due to either the scanning beam or the pattern of the antenna used to transmit the preamble information. During DPSK transmissions, we can assume x(t)=V=(a constant);
- w is the radian frequency of the IF signal, including inaccuracies in the ground and airborne systems, i.e.; (1a) $w = w_{if} + \epsilon_{if}$
- $\Phi(t)$ is the DPSK information phase. $\Phi(T)$ is either 0 or $\pi$ radians.

It is well known that s(t) can also be expressed in rectangular form in terms of the in-phase and quadrature components $s_I(t)$ and $s_Q(t)$.

$$s(t) = \text{Real}[s_I(t) + js_Q(t)] \tag{2}$$

In Differential Phase Shift Keying (DPSK) of digital information, the information is conveyed by the presence or absence of a $\pi$ radian (180°) difference in carrier phase between consecutive bit periods. In the MLS application, a binary 1 is indicated by a phase difference of $\pi$ radians, while a binary 0 is indicate by no phase change.

Classical DPSK demodulation requires that the input signal s(t) be delayed by a time equal to the reciprocal of the data rate (T=1/$F_d$) and then used as a reference signal in a mixer. In polar form:

$$\begin{aligned} v(t) &= \text{Real}[s(t)s^*(t-T)] \\ &= V^2 \, \text{Real}[exp\{-j(wt + \phi(t) + \theta - w(t-T) - \phi(t-T) - \theta)\}] \\ &= V^2 \, \text{Real}[exp\{-j(wT + \phi(t) - \phi(t-T))\}] \\ &= V^2 \cos(wT + \phi(t) - \phi(t-T)); \end{aligned} \tag{3}$$

where the "*" indicates the operation of a complex conjugation. Since in DPSK, the phase difference between two signals separated by T will be either 0 or $\pi$ radians, depending on the binary information, v(t) is a binary phase shift keyed (BPSK) video waveform. We will define $\Phi_I(t)$ as the information phase.

$$\Phi_I(t) = \Phi(t) - \Phi(t-T) \tag{3a}$$

Equation (3) indicates the two primary problems with this simple approach to DPSK demodulation for MLS applications. First of all, equation (3) indicates that there are values of wT for which the video signal v(t) is zero everywhere, and therefore no information can be decoded. Second, if w is unknown, as is the case in MLS applications, there is no way to identify the $\Phi_I(t) = \pi$ and $\Phi_I(t) = 0$ states.

One solution to the first problem is to process v(t) as a complex value, as follows.

$$\begin{aligned} v_c(t) &= s(t)s^*(t-T) \\ &= V^2 exp\{-j(wT + \phi_I(t))\} \end{aligned} \tag{4}$$

In this case, both the real and imaginary parts of $v_c(t)$ contain the BPSK information, which can therefore always be decoded. This approach does not solve the problem of an unknown IF frequency, w, however.

When the frequency w is precisely known, equation (3) completes the DPSK demodulation process, since, with wT known, we can interpret a priori whether positive values of v(t) correspond to an information bit of 1 or 0. As mentioned in the description of the prior art, however, frequency drifts in the ground and airborne MLS systems and doppler shifts due to aircraft motion can combine to cause wT to vary by more than 2$\pi$ radians. Thus, in MLS applications, we can never know the frequency w with sufficient accuracy to allow a priori interpretation of the information states.

The MLS signal format illustrated in FIG. 4 provides a means to overcome this difficulty by using the carrier acquisition period at the beginning of each MLS preamble. During this period, the C-band MLS carrier, and thus the IF output signal s(t), contains no phase modulation. In terms of equations (3) and (3a), $$\Phi_f(t) = \Phi(t) - \Phi(t-T) = 0 \tag{5}$$

during the carrier acquisition period, thus corresponding to a string of DPSK zeros. If we form an estimate of the complex signal during this time using equations (4) and (5).

$$\begin{aligned} r(t) &= s(t)s^*(t-T) \quad T < t < \text{ length of carrier acquisition period} \\ &= V^2 \exp\{-jwT\} \end{aligned} \tag{6}$$

Under the assumption that the effective IF frequency, w, does not change significantly over the DPSK message, the value of r(t) at the end of the carrier acquisition period can then be used as a complex reference signal to correct the $v_c(t)$ value derived from equation (4) for the unknown effective IF frequency, w, through a simple rotation. This simplifying assumption is valid in MLS operations, thus:

$$\begin{aligned} b(t) &= v_c(t)r^*(t) \\ &= V^4 \exp\{-j(wT + \phi(t) - \phi(t-T))\} \exp\{+jwT\} \\ &= V^4 \exp\{-j(\phi(t) - \phi(t-T))\} \\ &= V^4 \exp\{-j\phi_f(t)\} \end{aligned} \tag{7}$$

The real part of b(t) is $$\begin{aligned} b_R(t) &= \text{Real}[V^4 \exp\{-j\phi_f(t)\}] \\ &= V_4 \cos(\phi_f(t)) \end{aligned} \tag{8}$$

which is a normal BPSK video signal with a value of $+V^4$ for binary information of 0 and $-V^4$ for binary information of 1.

One of the advantages of the present invention is the removal of the effects of the unknown rotation wT. This is achieved by the application of the complex phase correction/rotation factor, r(t), after the DPSK demodulation process indicated by equation (3). As discussed earlier, previous implementations have always corrected for unknown IF phase and frequency errors before the DPSK demodulation.

Figure 7:
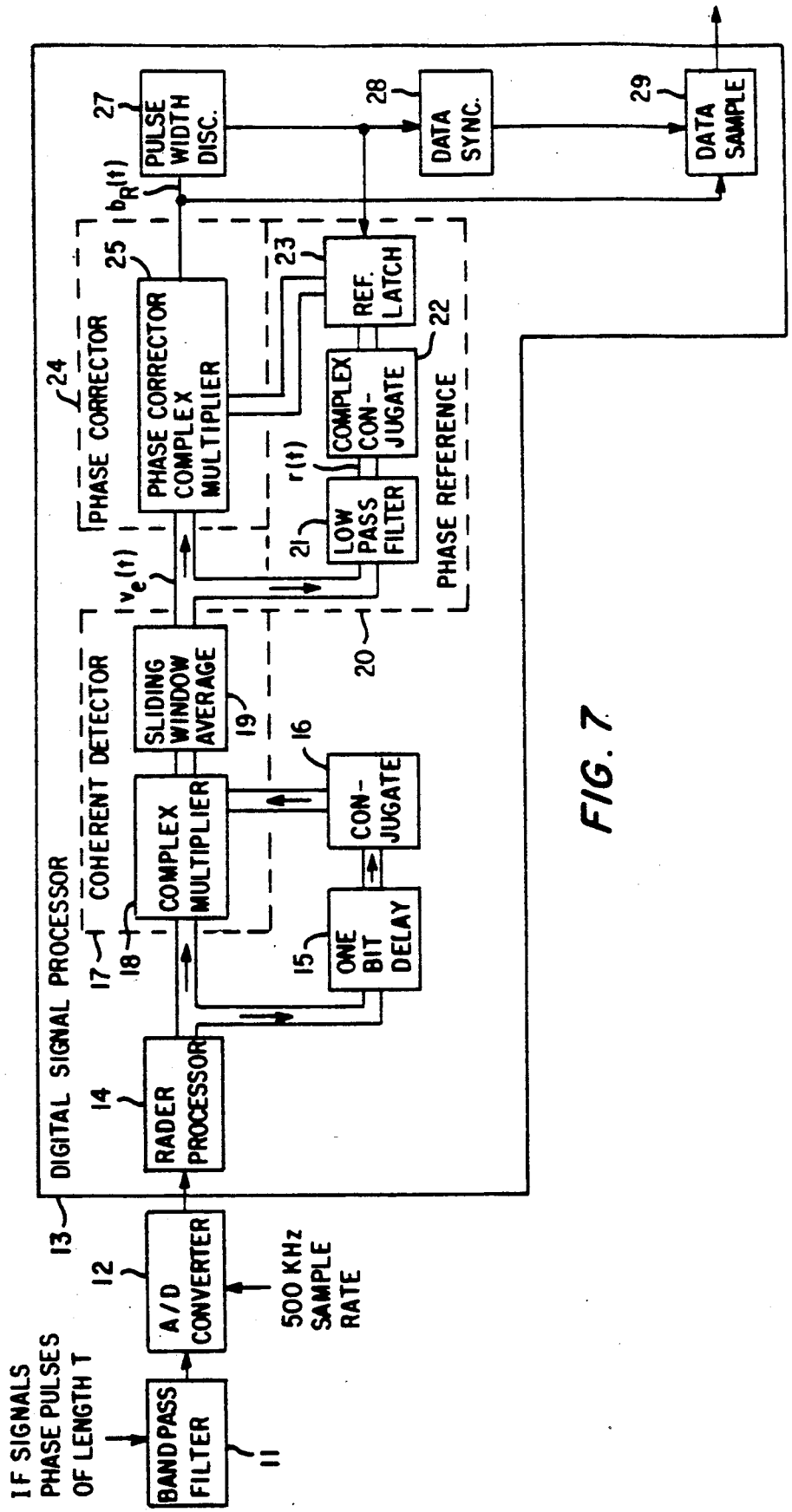
FIG. 7 illustrates one embodiment of the present invention.

A block diagram for one embodiment of the DPSK demodulation and decoding technique is illustrated in FIG. 7. IF signals having phase pulses of length T enter bandpass filter 11. Samples of the band-limited, down-converted MLS waveform are taken through A/D converter 12 into digital signal processor 13. Within digital signal processor 13, these samples are decomposed in Rader processor 14 into in-phase and quadrature components. The algorithms utilized in Rader processor 14 are discussed in "A Simple Method for Sampling In-Phase and Quadrature Components", Rader, C. M., IEEE Transactions on Aerospace and Electronic Systems, Vol. AES-20, No. 6, November 1984, as disclosed earlier. These components are treated as a single sample of the complex baseband envelope of the received MLS waveform.

The series of complex samples is delayed by one bit delay 15 for exactly one DPSK bit time and flows through the complex conjugate operation 16. The coherent detector 17 with its complex multiplier 18 and its sliding window average 19 takes the complex conjugate of the delayed sequence and multiplies it by the undelayed sequence. The signal is then low pass filtered by averaging together all samples in the previous bit period. This averaging process is known as the sliding window average. This series of operations results in a sequence of complex values whose phase angles are a measure of the phase difference between two consecutive DPSK bits.

Due to the fundamental uncertainties in the MLS IF frequency, the resultant series of complex values may have any phase angle. All values corresponding to consecutive bits which are in-phase will have nearly the same angle $\Phi_1$. All values corresponding to consecutive bits which are out of phase will likewise have a common value $\Phi_2$, where $\Phi_1 - \Phi_2 = 180°$.

Figure 8:
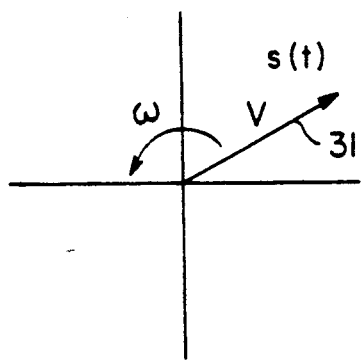
FIGS. 8a to 8d illustrate phasor diagrams for various stages in demodulation process.
Figure 8:
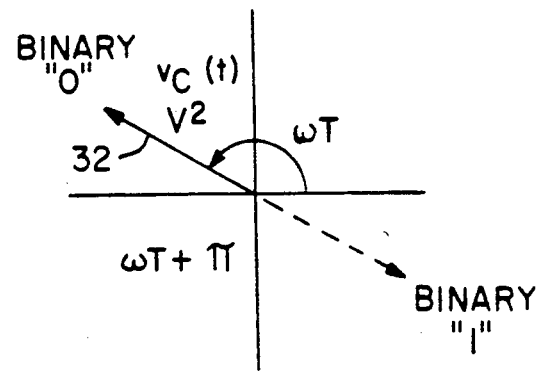
Figure 8:
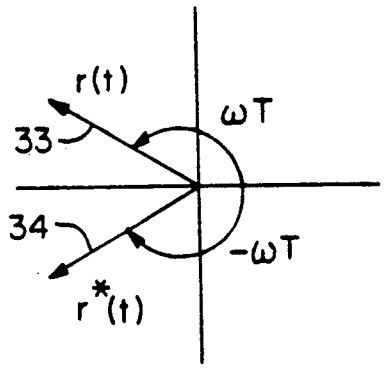
Figure 8:
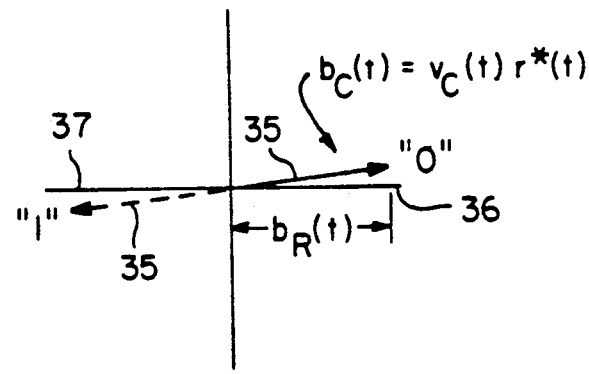

The series of complex values out of coherent detector 17 then enters a phase reference calculator 20 where the values are filtered through a low-pass filter 21 to smooth effects of measurement noise. During the 13 bit carrier acquisition period of each MLS preamble, the complex output of low pass filter 21 establishes a "reference" estimate, r(t), which explicitly defines the in-phase angle of $\Phi_1$. The complex output then enters the complex conjugate 22 and the complex conjugate of the low pass filter output, r*(t), enters the reference latch 23. The latched value is used as a reference vector for the phase corrector 24 which includes a phase correction complex multiplier 25 which rotates the phase detector output onto the real axis. Following this rotation, as shown in FIG. 8, all binary 0 values 35 will lie on or very near to the positive real axis 36, while all binary 1 values 35 will lie on or very near to the negative real axis 37. Since the result of the complex multiplier 25 is on, or very near, the real axis, only the real part need be used for further processing.

FIG. 8a illustrates the input signal, s(t) 31, in polar form as a rotating vector of length V and angular frequency w. The complex output of the coherent detector, $V_c(t)$ 32 is shown in FIG. 8b as either of two fixed vectors with magnitude $V^2$ and fixed phase of either wT or wT+$\pi$, depending on the encoded information. Note that $v_c(t)$ 32 is no longer rotating. As illustrated in FIG. 8c, the reference signal, r(t) 33, is established during the 832 usec period of unmodulated carrier, therefore it has a phase angle of wT. Its conjugate r*(t) is also illustrated. Finally, FIG. 8d illustrates the result of using r*(t) to correct $v_c(t)$. When the information is a binary zero, $b_c(t)$ 35 lies on or near the positive real axis 36. When the information is a binary 1, $b_c(t)$ 35 lies on or near the negative real axis 37.

Note that the actual phase of the complex signal is never computed directly. All of the processing from the Rader decomposition through the carrier tracking filter is performed on the complex values and therefore requires only multiplication and addition operations which can be performed at high speed in a microcomputer or in dedicated arithmetic hardware. There are no divisions or inverse trigonometric functions to be computed, thereby allowing the technique to be applied to higher data rates.

Returning to FIG. 7, the real result of the final phase rotation of the phase corrector 24 is applied to a pulse width discriminator 27, which is set to identify the presence of the 13-bit carrier acquisition signal. When the presence of this carrier acquisition signal is detected, the reference signal, r(t), is fixed for the duration of the MLS transmission.

Following the pulse width function discriminator 27 the real result flows through a data sync 28 which applies algorithms to detect the characteristic Barker code and establish bit synchronization. The result than flows through a data sample 29 which applies algorithms which sample the result to establish binary information in accordance with the signal format and parity constraints defined in *Annex 10 to the Convention on International Civil Aviation;* Volume 1, Chapter 3.11, ICAO, Montreal, October 1987.

Figure 9:
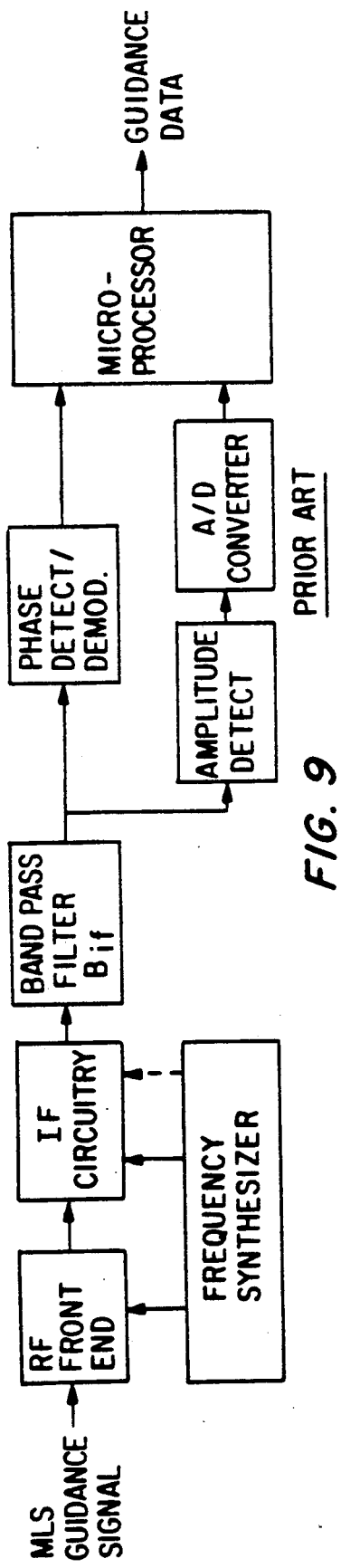
FIG. 9 illustrates typical MLS receiver architecture.

To further describe the input signal, we can utilize typical MLS receiver architecture as illustrated in FIG. 9, where the C-band MLS signal, including data and scanning beam transmissions, is down-converted and amplified from the 5 GHz range to a convenient IF frequency. In the process, a single MLS channel is selected by filtering the IF signal through a bandpass filter. The bandwidth of this filter is chosen to allow for worst case combinations of ground frequency drift, aircraft doppler, and MLS receiver local oscillator drift. The shape of this filter is chosen to accommodate the 300 kHz channel spacing required in *Annex 10 to the Convention on International Civil Aviation;* Volume 1, Chapter 3.11, ICAO, Montreal, October 1987 and the adjacent channel rejection requirements stated in *Minimum Operational Performance Standards for Microwave Landing System Airborne Receiving Equipment,* DO-177, Change 2, RTCA, Washington, D.C., September 1986. The effect of this filter is to band-limit the MLS signal. Typical MLS receiver designs have chosen multiple pole filters with an IF bandwidth of 100-150 kHz to satisfy these requirements.

It is important to note that the requirements on MLS receiver bandwidth are primarily driven by frequency source stability and not the actual information bandwidth of the MLS signal, which is approximately equal to the DPSK data rate, 15.625 kHz.

Figure 10:
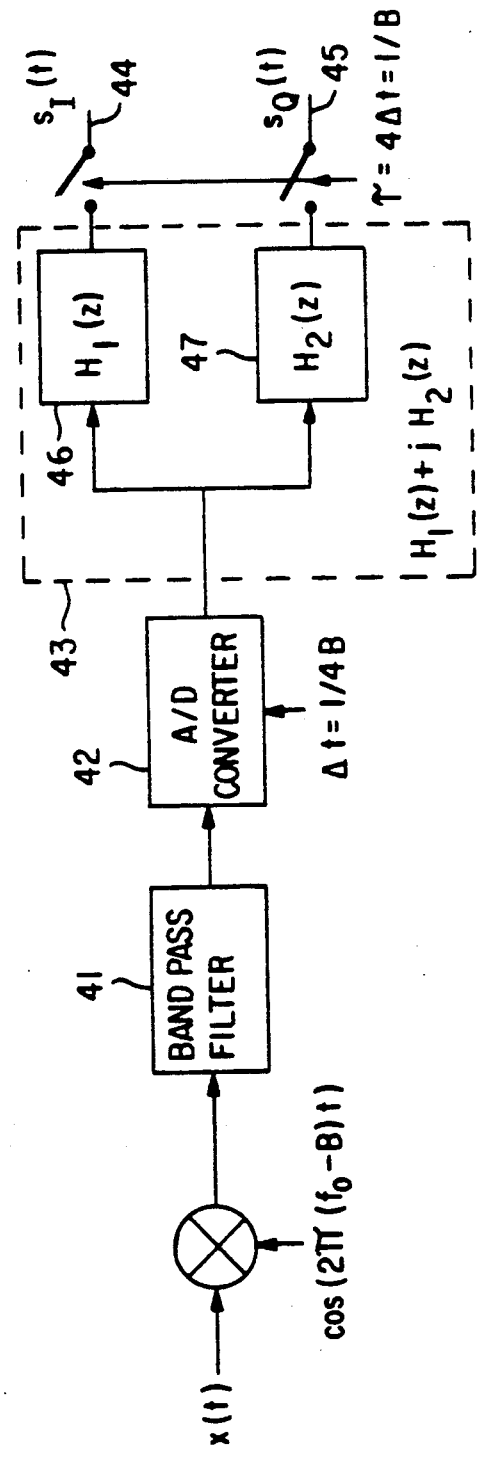
FIG. 10 illustrates a system for developing in-phase and quadrature components of a complex baseband envelope.

When the input signal enters the digital signal processor 13 of FIG. 7, it is processed by Rader processor 14. "A Simple Method for Sampling In-Phase and Quadrature Components", Rader, C. M., IEEE Transactions on Aerospace and Electronic Systems, Vol AES-20, No. 6, November 1984 describes a technique for decomposing an IF signal into its constituent in-phase (I) and quadrature (Q) components using a combination of a rapid sample rate, relatively low IF frequency, and digital filtering techniques. As described by Rader, if the total bandwidth of the signal is B Hertz, the desired IF frequency is B Hertz, and the desired sample rate is 4B samples per second. The output of the Rader processor 13 is a stream of I and Q samples, each occurring at a rate B, describing the complex baseband envelope of the IF waveform. FIG. 10 illustrates an implementation of the Rader technique. As is illustrated in FIG. 10, the IF signal enters bandpass filter 41 and then flows to A/D converter 42. The signal then enters Rader processor 43 where the IF signal is decomposed into its in-phase (I) 44 and quadrature (Q) 45 components.

Applying the Rader processor 43 to a signal band-limited by an MLS IF filter described in the previous paragraph would indicate a sample rate of 400-600 kHz (2.5-1.66 usec spacing), and a minimum IF frequency of 100-150 kHz. These sample rates and IF frequencies result in a near-perfect representation of the complex baseband envelope of the entire 100-150 kHz MLS bandwidth, which as noted earlier, is six to ten times greater than the information bandwidth of the MLS DPSK channel.

The Rader processor 43 relies on the 4:1 relationship of the input and output sample rates to simplify the implementation of filters $H_1(z)$ 46 and $H_2(z)$ 47. The technique works with virtually no degradation even when the actual sample rate and IF frequency vary slightly from the 4:1 relationship. For the purposes of demodulating the MLS DPSK, it is extremely desirable to have an integer number of samples occur in a single DPSK bit period of 64 usec. Thus, a preferred sample rate is 500 kHz providing 2 usec sample spacing and 32 samples per DPSK bit. A sample rate of 250 kHz or below is unacceptable, since it will lead to aliasing of the IF frequency and will disrupt the I and Q relationship of the Rader processor 43 outputs.

A key feature of the Rader processor 43 is that the net filter transfer function H(z) is complex, consisting of $H_1(z) + jH_2(z)$. Thus the H(z) filter is unrealizable in a physical sense without decomposition into I and Q channels via a power divider, quadrature mixers, etc. This approach of processing the complex envelope of the signal is carried throughout the remaining DPSK demodulation process.

Following the Rader processor decomposition, we are left with I and Q samples spaced 8 usec apart. In the event that the mathematical operations described next can not be accomplished in this period, acceptable performance may be obtained by further down-sampling this complex envelope to 16 usec, 32 usec or even 64 usec intervals. The minimum sample rate of 15.625 complex samples per second still satisfies all Nyquist requirements for the 15.625 kHz MLS bit rate. Such down-sampling may cause aliasing of any error frequency $\epsilon$ and will reduce noise performance by eliminating the possibility for filtering the phase detector output. Aliasing of the error frequency $\epsilon$ will not, in itself, affect the succeeding processing.

The coherent detection process of the coherent detector 17 of FIG. 7 involves a straightforward complex multiplication in rectangular form. This process involves only multiplication and addition operations, and can thus be efficiently implemented in either hardware or software. With a complex input signal s(t) from the Rader processor 14 we have the following.

$$s(t) = s_I(t) + js_Q(t) \tag{9}$$

$$\begin{aligned} v(t) &= s(t)s^*(t - T) \\ &= [s_I(t)s_I(t - T) + s_Q(t)s_Q(t - T)] + \\ &\quad j[-s_I(t)s_Q(t - T) + s_Q(t)s_I(t - T)] \end{aligned} \tag{10}$$

The coherent detector output is this result filtered by the sliding window average 19 having a duration equal to the DPSK bit width of 64 usec. Assuming the nominal 8 usec period between samples ($\tau = 8$ usec), there are eight samples within the sliding window.

$$v_c(t) = (1/8) \sum_{n=0}^{7} v(t - n\tau) \tag{11}$$

This filtering process requires only additions and a 3 place binary shift to divide by eight.

The phase reference computation as performed by the phase reference 20 will now be described. During the 13 bit carrier acquisition period, the complex synchonous detector output $v_c(t)$ given by equation (11) is essentially constant. This complex value is first low pass filtered by low pass filter 21 to establish the reference phase signal r(t). Although the filter implementation is up to the designer, a single pole recursive filter has demonstrated adequate performance.

$$r(t) = Ar(t-\tau) + (1-A)v_c(t) \quad (12)$$

where $\tau$ is the net sample rate, nominally 8 usec.

The signal then flows to the phase corrector 24 where the complex value r(t) is used as an estimate of the unknown "zero-degree phase" vector, including any effects of IF frequency errors. A corrected signal $b_R(t)$ is created in accordance with equation (8), using the rectangular form of r(t).

$$b_R(t) = v_{cI}(t)r_I(t) + V_{cQ}(t)r_Q(t) \quad (13)$$

Once again, this process is implemented in either hardware or software with only a simple multiply and accumulate function. Some intermediate scaling of the multiplicands may be necessary to prevent overflow of the result $b_R(t)$.

The real output $b_R(t)$ is an integer value whose algebraic sign represents the encoded binary information. After the Rader processor 14, sliding window average 19, and low pass filters 21 have settled down, this value will remain positive for the remainder of the 13 bit acquisition period. The pulse width discriminator 27 checks the sign of $b_R(t)$, and enables further processing when the signal is positive for longer than a fixed period of time. In the preferred MLS embodiment, this period is set to 640 usec, or 10 DPSK bits.

Figure 11:
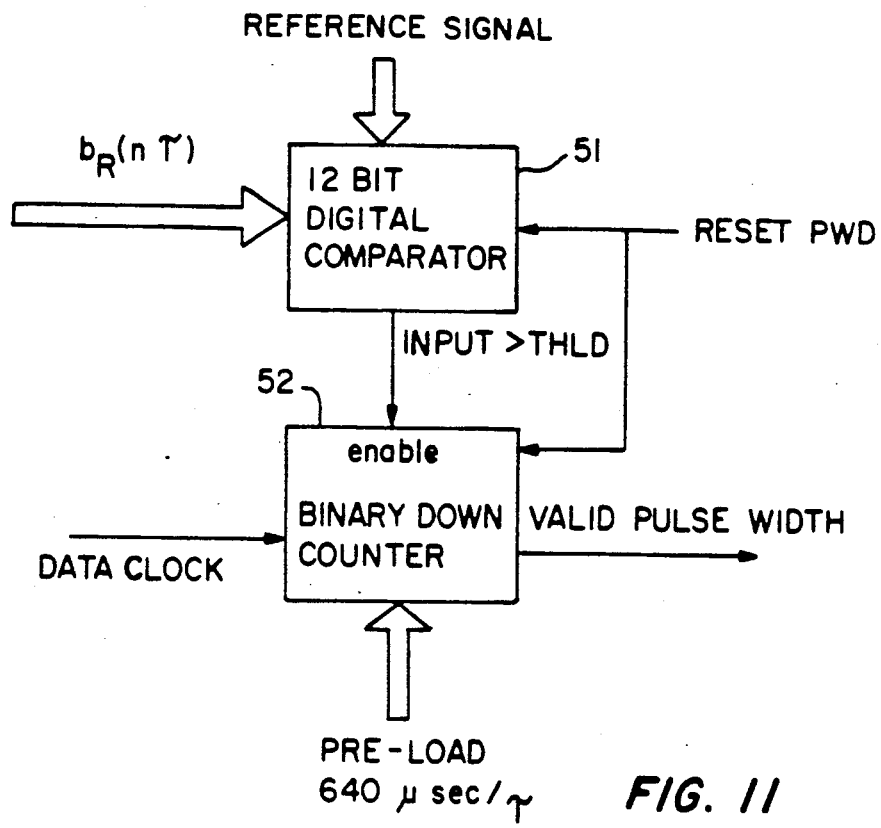
FIG. 11 illustrates a pulse width discriminator.

The pulse width discriminator 27 involves a digital comparator 51 and a binary down counter 52, as shown in FIG. 11, and can be implemented in either hardware or software, as appropriate to the intended application.

The output of the pulse width discriminator 27 is low until a valid pulsewidth is detected. Upon detection the output transitions immediately to a high condition, and remains high until reset at the end of the MLS function. The low-to-high transition causes two actions to occur:

(1) the complex reference value $r(t_{pwd})$ at the transition time, $t_{pwd}$, is latched and used for the remainder of the DPSK function;

(2) the real BPSK video output, consisting of a sequence of digital words representing $b_R(t)$ is gated to the synchronization and data sampling algorithms, discussed below.

The data sync 28 will now be described. The MLS signal format utilizes a five bit Barker Code (binary data 11101) for receiver time synchronization. This code is transmitted immediately following the 13 bit acquisition period. The receiver reference time is defined as the midpoint of the final phase transition.

Figure 12:
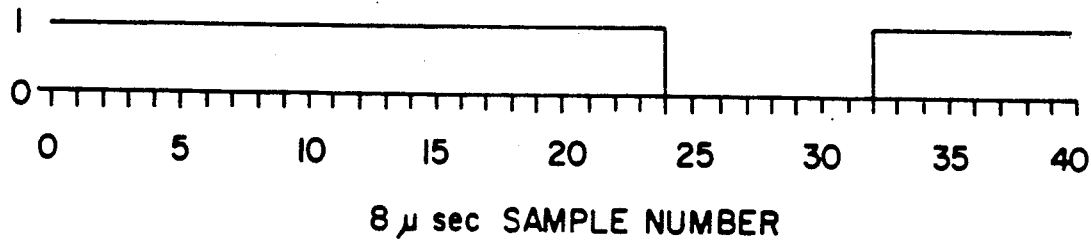
FIG. 12 illustrates a Barker Code template.

This reference time is ideally recovered by use of a matched filter to correlate the received BPSK video signal $b_R(t)$ against a Barker Code template, BC(t). To ensure proper operation, BC(t) must be sampled at the same rate as $b_R(t)$, thus, for the 8 usec sample rate used in this discussion, the Barker Code Template, BC is shown in FIG. 12. Use of a matched filter approach will result in the best approximation of the true reference time.

Figure 13:
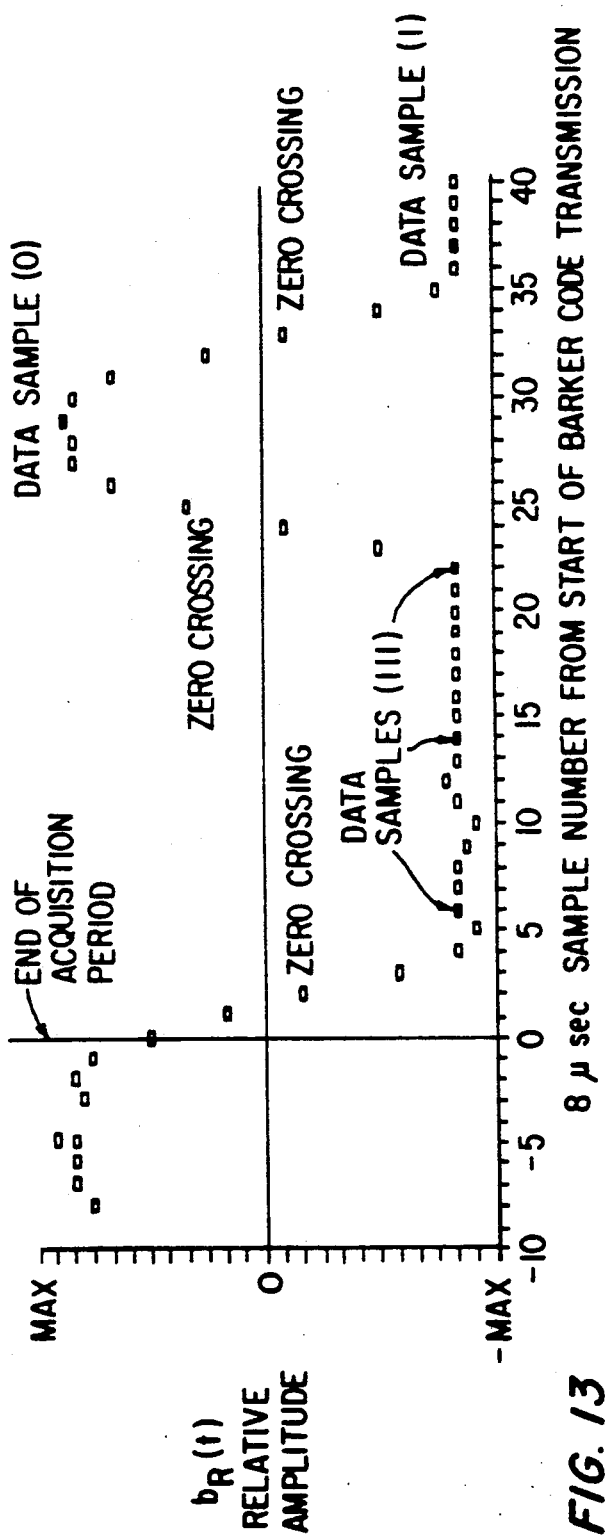
FIG. 13 illustrates a sub-optimum method for Barker Code synchronization.

Time constraints on the real time processing may make the ideal matched filter impractical to implement. Sub-optimal methods of attaining synchronization are acceptable in the MLS application. One such technique which has been shown to provide acceptable MLS performance is the "zero-crossing-reset" method which is illustrated in FIG. 13, and discussed below.

Figure 14:
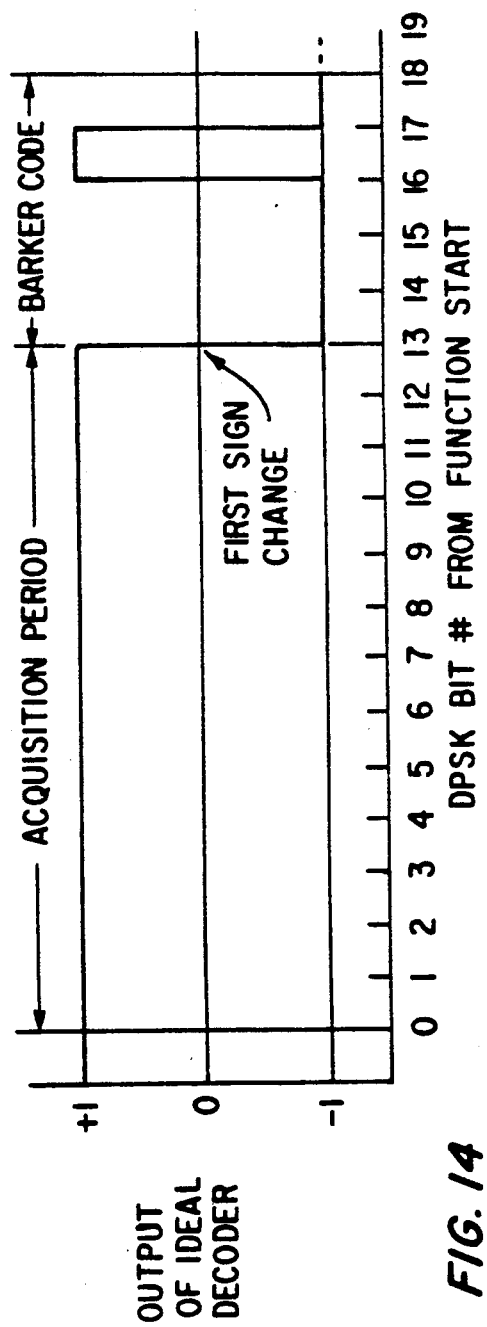
FIG. 14 illustrates a perfect MLS signal.

Once the pulse width discriminator 27 of FIG. 7 has indicated that a valid candidate signal is present, successive values of $b_R(t)$ are examined until the first sign crossing takes place. In a perfect MLS signal, as illustrated in FIG. 14, this should occur at the end of the 13th acquisition bit, which is a logical "0" and the start of the first Barker Code "1". If there are N samples per DPSK bit (N=8 for 8 usec samples), the sign of the (N/2)th value of $b_R(t)$ after the sign transition is examined, and the appropriate BPSK binary value ("0" or "1") is entered into a five bit shift register. This process is repeated every Nth sample after this first entry until either another sign change is detected or ten bits are sampled.

If another sign change is detected between samples of the BPSK binary value, the succeeding BPSK sample is taken (N/2) samples after the transition, this process is repeated every Nth sample after the new BPSK sample until either another sign change is detected or a total of ten bits are sampled.

As each new BPSK sample is shifted into the shift register, the register contents are compared to the Barker Code template of 11101. If a Barker Code match occurs, the interpolated zero crossing between the two samples bracketing the previous sign changes is accepted as the reference time. This interpolation process may require a microprocessor, although all other steps are effectively implemented directly in hardware.

If no Barker Code match occurs after 10 BPSK data samples, the entire demodulation process, including the pulse width discriminator and all filter memories, is reset and restarted.

The data sampling process performed in data sample 29 of FIG. 7 is described as follows. Once the Barker Code has been identified, the sign of every Nth BPSK video value is examined to arrive at the proper BPSK data. Positive BPSK video values are logical BPSK "0" values. Negative BPSK video values are logical BPSK "1" values. At this point, conventional data decoding, parity checking and data validation algorithms may be used.

Figure 15:
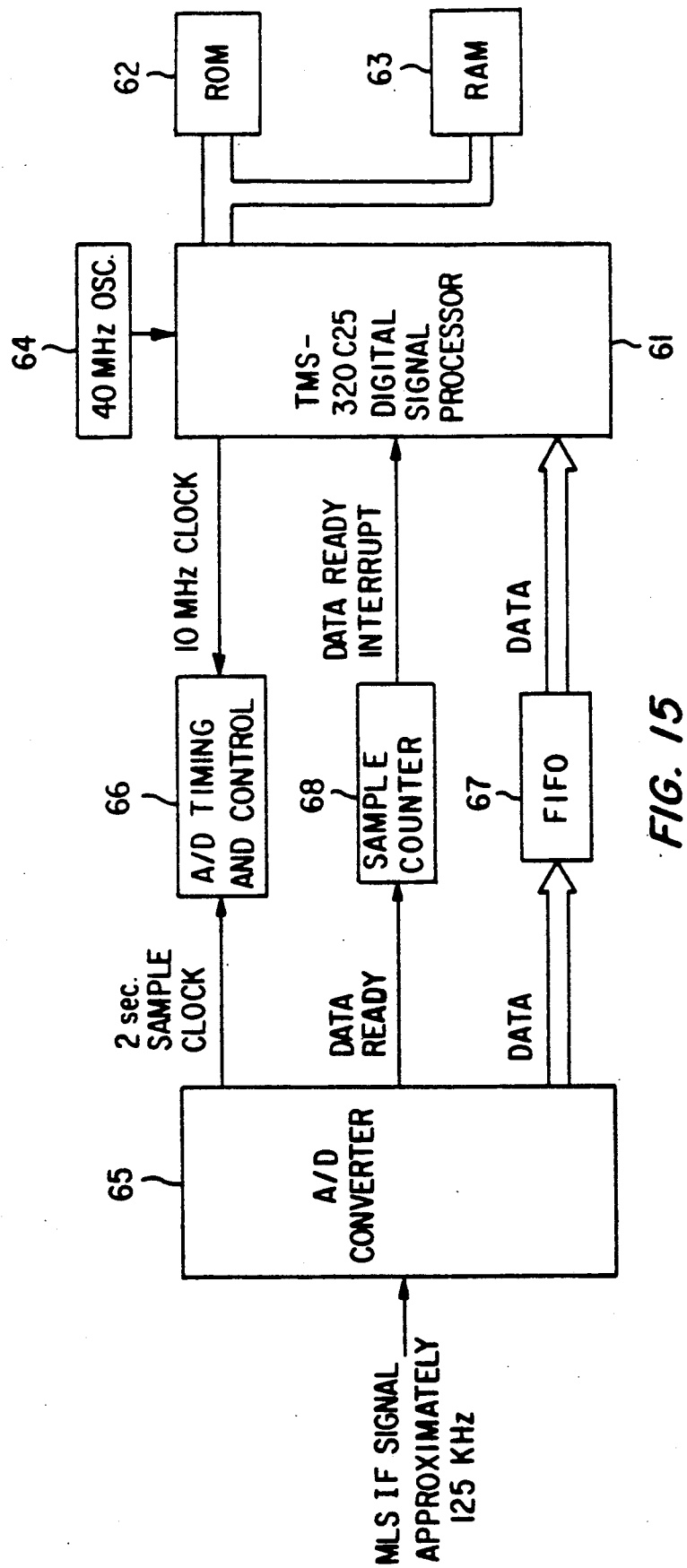
FIG. 15 illustrates a preferred embodiment of the present invention.

A block diagram of a preferred embodiment of the present invention is illustrated in FIG. 15. In this embodiment, the high-speed capabilities of the TMS-320C25 digital signal processor chip 61 with its ROM 62, RAM 63 and oscillator 64 are utilized to implement the entire process just described in software. Support logic includes a 12-bit analog-to-digital converter 65 and its associated timing and control circuitry 66. The interface to the digital signal processor chip 61 is through a FIFO 67. The counter 68 is used to count a fixed number of data samples (either 4 or 8) collected in the FIFO 67 before digital signal processor interrupt request are issued.

Figure 16:
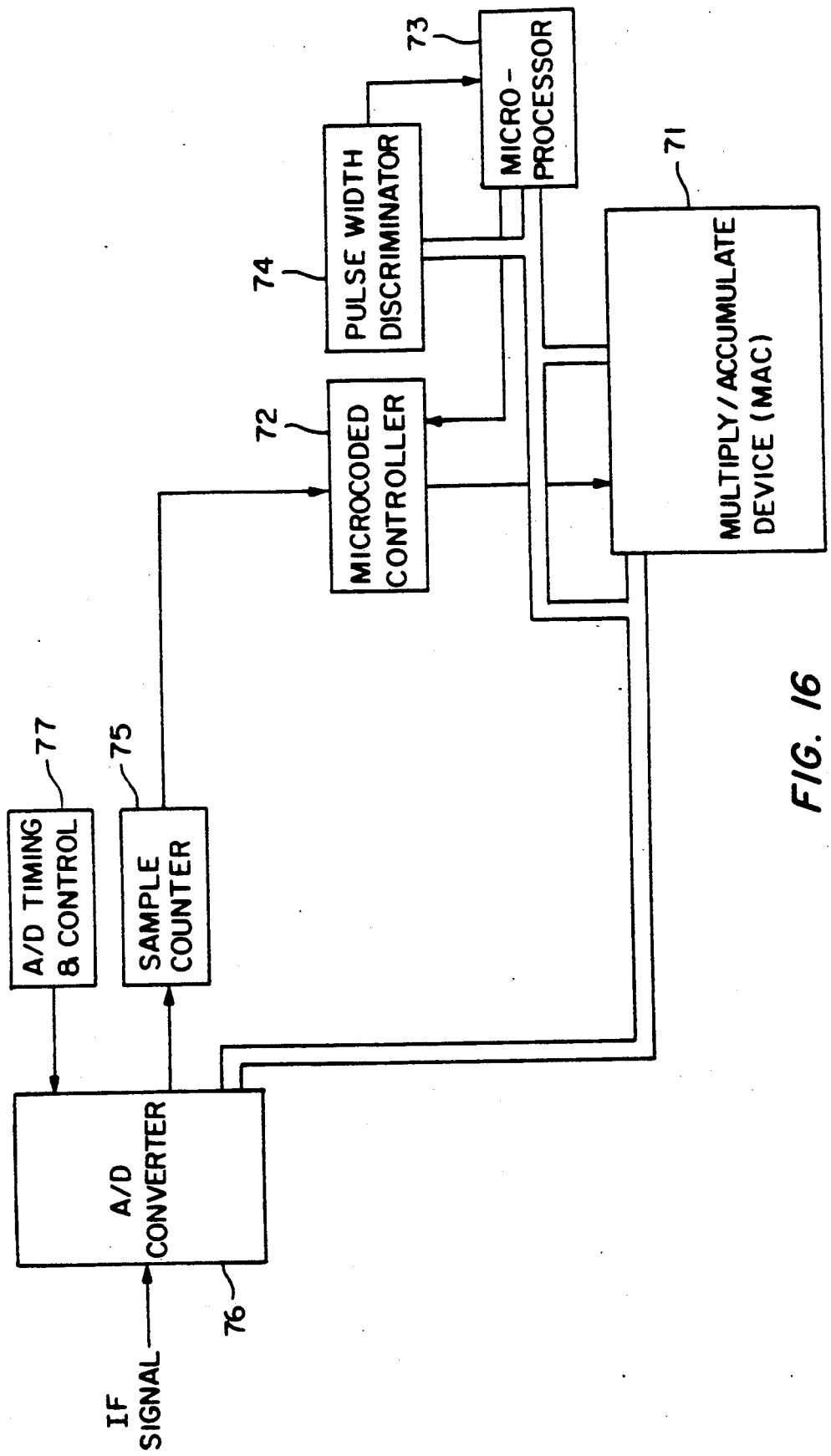
FIG. 16 illustrates a generalized embodiment of the present invention.

A block diagram of a more generalized embodiment of the present invention is shown in FIG. 16. This embodiment is based on the same general purpose hardware-digital signal processor architecture illustrated in U.S. Pat. No. 4,926,186 by Kelly and LaBerge and assigned to the same assignee as the present invention. This architecture uses one of several commercially available multiply and accumulator (MAC) chips 71 under microcode control from the microcoded controller 72 to perform the various arithmetic operations described earlier at a significantly higher speed than that currently available in a software controlled digital signal processor chip. Also illustrated in FIG. 16 is microprocessor 73, pulse width discriminator 74, sample counter 75 and A/D Converter 76 with its timing and control circuitry 77. Increasing the computation speed, allows use of a higher A/D clock rate and correspondingly higher IF frequency and signal bandwidth. This implementation may be attractive when adopting the present invention to non-MLS applications.

Although the present invention was developed specifically for an MLS application, it may be applicable to any DPSK demodulation application, providing an MLS-like carrier acquisition period is available.

It is not intended that this invention be limited to the hardware or software arrangement, or operational procedures shown disclosed. This invention includes all of the alterations and variations thereto as encompassed within the scope of the claims as follows.

We claim:

1. A system for demodulating and decoding differential phase shift keying transmissions comprising:
   bandpass filter means for receiving signals and for providing filtered signals;
   analog to digital converter means for receiving said filtered signals and for providing digital signals; and,
   digital signal processor means for receiving said digital signals and for resolving said digital signals into complex signals of in-phase and quadrature components by digital means, for providing coherent detection of said complex signals of in-phase and quadrature components which provides detected complex signals, for then providing phase tracking and correction of said detected complex signals, and for discriminating proper Microwave Landing System signal characteristics; wherein said digital signal processor means comprises:
   Rader processor means which receives said digital signals and resolves said digital signals into a series of complex signals of in-phase and quadrature components by digital means;
   delay means which delays said series of complex signals;
   conjugate means for receiving said delayed series of complex signals and for providing a conjugate;
   coherent detector means for receiving said conjugate of said delayed series of complex signals and also for receiving an undelayed series directly from said Rader processor means and for providing a demodulated series of complex values whose phase angles are a measure of phase difference between two consecutive differential phase shift keying bits;
   phase reference means for filtering said demodulated series of complex values from said coherent detector means therefore establishing a reference estimate of r(t), for complex conjugating said reference estimate of r(t) therefore providing a complex conjugate, for latching said complex conjugate and for providing a latched value which is used as a reference vector;
   phase corrector means which receives said latched value and said demodulated series of complex values directly from said coherent detector mans and rotates said demodulated series of complex values onto a real axis therefore providing a real result;
   pulse width discriminator means for receiving said real result from said phase corrector means, for identifying presence of a 13-bit carrier acquisition signal, for fixing a reference signal r(t) for duration of system transmission and for providing a valid pulse width detect signal;
   data sync means for receiving said real result from said phase corrector means and said valid pulse width detect signal from said pulse width discriminator means, for applying algorithms to detect characteristic Barker code and establish bit synchronization and for providing an output signal; and,
   data sample means for receiving said output signal from said data sync means and for applying algorithms which sample said output signal to establish binary output information representing demodulated and decoded differential phase shift keying transmissions.

2. A system as described in claim 1 wherein said Rader processor means resolves said digital signals into a series of complex signals of in-phase and quadrature components which are treated as a single sample of a complex baseband envelope of a received waveform.

3. A system as described in claim 1 wherein said delay means delays said series of complex signals for exactly one differential phase shift keying bit time.

4. A system as described in claim 1 wherein said coherent detector comprises:
   complex multiplier means which receives said conjugate of said delayed series, multiplies it by said undelayed series received directly from said Rader processor and provides a multiplied output.

5. A system as described in claim 4 wherein said coherent detector further comprises:
   sliding window average means which receives said multiplied output, averages together all samples in a previous bit period, and provides said demodulated series of complex values.

6. 8. A system as described in claim 1 wherein said phase reference means comprises:
   low pass filter means which takes said demodulated series of complex values from said coherent detector means, smoothes effects of measurement noise and establishes said reference estimate of r(t) which defines an in-phase angle of $\Phi_1$.

7. A system as described in claim 6 wherein said phase reference means further comprises:
   complex conjugate means which receives said reference estimate of r(t) from said low pass filter means and provides complex conjugate r*(t).

8. A system as described in claim 7 wherein said phase reference means further comprises:
   reference latch means which receives said complex conjugate r*(t) from said complex conjugate means and provides said latched value.

9. A system as described in claim 1 wherein said phase corrector means comprises:
   phase corrector complex multiplier means which receives said latched value from said phase reference means and receives said demodulated series of complex values directly from said coherent detector means and rotates said demodulated series of complex values onto said real axis therefore providing said real result.

10. A system as described in claim 1 wherein said pulse width discriminator means comprises:
    a digital comparator and a binary down counter and can be implemented in either hardware or software.

* * * * *